UNITED STATES PATENT OFFICE.

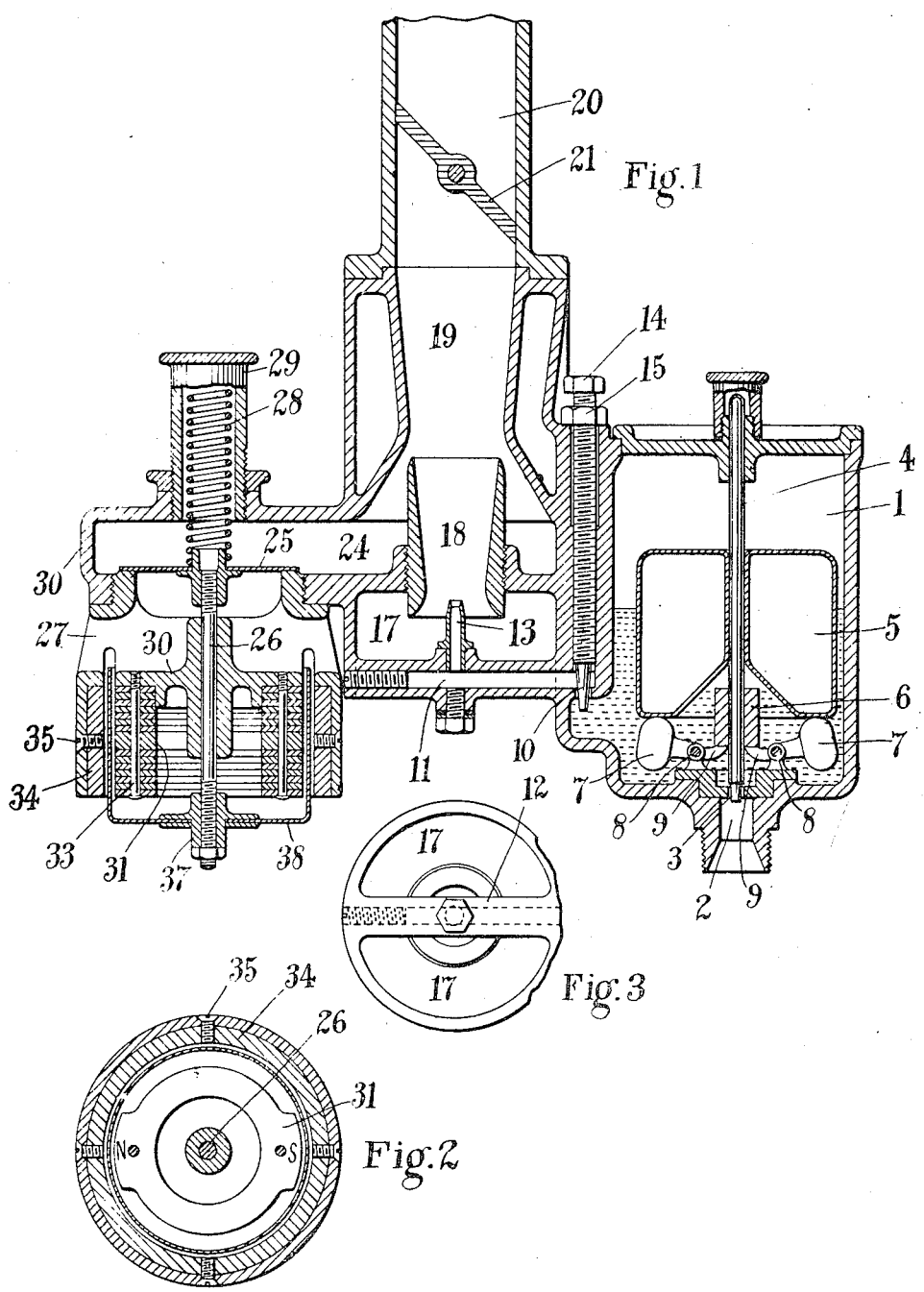

LEON J. LE PONTOIS, OF NEW ROCHELLE, NEW YORK, ASSIGNOR OF ONE-HALF TO BENJAMIN HURD, OF NUTLEY, NEW JERSEY.

CARBURETER.

1,069,576.  Specification of Letters Patent.  Patented Aug. 5, 1913.

Application filed February 17, 1909. Serial No. 478,422.

*To all whom it may concern:*

Be it known that I, LEON J. LE PONTOIS, a citizen of the Republic of France, residing at New Rochelle, in the county of Westchester and State of New York, have invented certain new and useful Improvements in Carbureters, of which the following is a full, clear, and exact specification.

This invention relates to carbureters, and has particular reference to carbureters of the type wherein at a certain engine speed an auxiliary air valve is opened to permit a greater proportion of air in proportion to gasolene to be admitted into the mixing chamber of the carbureter. In such carbureters difficulty has been found in regulating the action of the air valve, since at one instant it is subjected to the vacuum produced by the engine piston and opened quickly, and at the next instant this pressure is suddenly relieved so that the valve quickly closes. This quick opening and closing of the valve is objectionable for the reason that it renders the mixture uneven and is also noisy.

It is the object of this invention to provide, in combination with the air valve of a carbureter, a damping means whereby the vibrations of the valve are slowed down and its action rendered more uniform, whereby a more uniform and reliable mixture will be produced.

In carrying out my invention I have provided, in combination with the air valve of a carbureter, a magnetic damper comprising a permanent magnet and a damper carried by the stem of the air valve and movable in the field of the magnet so that the reciprocatory movements of the valve will be controlled by the magnetic damper.

The invention will be more fully understood in connection with the description of the accompanying drawings, wherein—

Figure 1 is a vertical section of a carbureter embodying the invention, Fig. 2 is a horizontal section through the damping device, and Fig. 3 is a detail seen from beneath of the main air inlet.

1 represents a float chamber having a passage 2 leading from a source of fuel supply, not shown, which passage 2 is controlled by a float operated valve 3.

5 is a float sliding on the stem 4 of valve 3 and serving to lift the valve by means of a collar 6 and small levers 7 pivoted at 8, whose short ends 9 engage the collar 6 to lift the valve. Whenever the level of gasolene in the chamber 1 falls sufficiently to allow the float to rest on the ends 7 of the levers, the valve stem 4 will be lifted and gasolene permitted to flow into the float chamber until the float rises sufficiently to allow the collar 6 to overbalance the lever 7 and close the valve. From the float chamber 1 gasolene passes through a needle valve 10 to a passage 11 contained in a bridge piece 12, and leading to a nozzle 13. As will be seen, the needle valve 10 is carried in the carbureter casing between the float chamber and the nozzle, and can be adjusted from above by means of the screw 14 in the set nut 15.

17 is the air inlet space leading to the primary mixing chamber 18 immediately above the nozzle 13, from which mixing chamber 18 the gas passes upward through a chamber 19 to pipe 20 containing the throttle 21, and thence to the engine, not shown.

When the engine is running under normal conditions, the parts above described, with proper adjustment of the needle valve, provide a mixture of right proportions, but when the speed of the engine is increased it is desirable to provide an additional air supply, which air supply is controlled by a valve which remains seated until the engine reaches a predetermined speed. If the auxiliary air valve be an ordinary spring-controlled check valve, it is opened during every suction stroke of the engine and closed during the remainder of the cycle, and as these actions of the valve occur very rapidly owing to the inertia of the valve there will be an objectionable chattering of the valve and also irregularity upon slight variation of the engine speed. The result is that the composition of the mixture at speeds where the auxiliary air supply is desired, is uneven, at one time there being too much air and at another time too little.

It is an object of this invention to provide, in conjunction with an air valve, a damping arrangement whereby the period during which the valve is opened is prolonged, a more even mixture produced, and easier seating of the valve effected. In attaining this object I have provided, in combination with a normally seated air valve, a magnetic damper whereby the friction involved in the use of dash pots and similar devices is entirely eliminated.

24 represents an auxiliary air passage controlled by a valve 25 carried on a stem 26 and normally held seated to close the passage 27 by means of a spring 28, the tension of which can be adjusted by the screw 29. When the engine reaches a speed predetermined according to the tension of the spring 28, the valve 25 opens and admits an additional supply of air into the secondary mixing chamber 19 to further dilute the charge first formed in the mixing chamber 18. In order to dampen the movement for the valve 25, there is mounted on the frame 30 containing the auxiliary passage 24 an annular permanent magnet 31 having poles N, S. This magnet is preferably composed of individually magnetized laminæ divided into two or more sections by a non-magnetic ring or rings 32, the laminæ and the rings being secured to the support by screws 33. By dividing the magnet into sections, the induced currents in the conductor are stronger. Separated from the poles of the magnet 31 and surrounding it is a soft iron or magnetized steel ring 34 carried by the brass or non-magnetic support 30, and through which the magnetic circuit of the magnet 31 is closed. The lower end of the valve stem 26 is threaded, and screwed thereon is a hub 37 carrying a damping device 38 composed of conducting material which extends upwardly between the poles of the magnet 31 and the stationary conductor 34. Preferably this conductor will be made in the form of a ring or cup having a greater area opposite the poles than the cross-section of the magnetic flux.

It will be seen that whenever the valve is lifted the conductor 38 is lifted, and by reason of the magnetic field in which this conductor moves any movement thereof will cause electric currents to be induced therein, which currents react on the magnetic field so as to produce a drag on the conductor opposing its movement, and consequently retarding the movement of the valve, and damping the rapid fluctuations of the valve. Although the construction shown is preferable, owing to its compactness, it is evident that any electrical conductor moved by the valve in a magnetic field would produce similar results. It will thus be seen that the valve will not be subject to the same rapid fluctuation and vibration, that it otherwise would, and that it tends to assume a mean open position depending on the mean vacuum corresponding to variations in the engine speed, and also a more even auxiliary supply of air will be provided.

By the use of a magnetic damper it will be seen that a very light construction of air valve can be used which will not be subject to the same deterioration and shock, by reason of the cushioning effect of the damper. Furthermore, there is not the same loss by friction as there is in mechanical retarding devices, and the valve being much lighter is much more sensitive to the fluctuations of pressure, and therefore capable of more accurate adjustment.

The invention as herein described is capable of application to other structures than those specifically described herein, and various modifications and changes may be made without departing from the scope of the invention.

Having thus described my invention, I declare that what I claim as new and desire to secure by Letters Patent, is:—

1. The combination in a carbureter with a valve mounted to be unseated by variations of pressure, of electro-inductive means effective by the movement of the valve for regulating such movement.

2. The combination in a carbureter, of a valve mounted to be unseated by variations of pressure, and electro-inductive means effective by the movement of the valve for regulating such movement.

3. The combination in a carbureter with a vibratory air valve mounted to be unseated by variations of pressure, of electro-inductive means for regulating the vibrations of said valve and tending to cause it when open to assume a mean position varying with the actuating pressure.

4. The combination in a carbureter with a valve adapted to supply air, of means connected with the valve stem and moving in a magnetic field whereby to regulate the degree of movement of the valve.

5. The combination in a carbureter, of an auxiliary inlet, a vibratory pressure operated valve controlling said auxiliary inlet, a magnet adjacent the valve stem, and a coöperating element carried by the valve stem and movable in the magnetic field.

6. The combination in a carbureter with a valve, of a permanent magnet, a stationary magnetic conductor separated from the magnet poles, and an electric conductor moving in said space and operated by the valve.

7. The combination in a carbureter with a valve adapted to supply air when opened by the engine suction, of a permanent magnet, a stationary magnetic conductor surrounding the magnet and separated therefrom, and an electrical conductor carried by the valve stem comprising a ring interposed in the air gap between the magnet poles and the stationary magnetic conductor.

8. The combination in a carbureter with a valve operated by a spring in one direction, of a magnetic damper for regulating the movements of the valve in said direction and in another direction.

9. The combination in a carbureter with an air valve adapted to open in one direction by pressure, of a permanent magnet divided into sections, a non-magnetic element carried by the valve stem and inclosing the magnet, and a stationary armature surrounding said element.

10. The combination in a carbureter with an air valve adapted to open by pressure, of a magnet and a conductor in the magnetic field, and connections causing relative movement between the conductor and the magnet when the valve moves, whereby to regulate the valve movement and prolong its period.

11. The combination in a carbureter, of a reciprocatory, pressure operated valve, and electro-dynamic means including a part reciprocating with said valve for regulating the movements thereof.

12. The combination in a carbureter with a vibratory valve tending normally to close and opened by air pressure, of a magnetic element and an electric conducting element movable relative to said magnetic element and coöperating therewith upon relative movement to produce by electro-induction a force acting to reduce the normal amplitude of vibration of the valve as the resultant actuating force varies.

13. The combination in a carbureter with a vibratory valve tending normally to close and opened by air pressure, of a stationary magnetic element and an electric conducting element carried by said valve, said magnetic element and said electric conducting element coöperating upon vibration of said valve to produce by electro-induction a retarding force effective to equal degree in both directions in reducing the normal amplitude of vibration of the valve as the resultant of the opening and closing forces vary.

In testimony whereof I affix my signature in presence of two witnesses.

LEON J. LE PONTOIS.

Witnesses:
J. S. WOOSTER,
GEO. N. KERR.